United States Patent
Amin

Patent Number: 6,044,424
Date of Patent: Mar. 28, 2000

[54] HOT-PLUG POWER SUPPLY FOR HIGH-AVAILABILITY COMPUTER SYSTEMS

[75] Inventor: Dilip Amin, San Jose, Calif.

[73] Assignee: Silicon Graphics, Inc., Mountain View, Calif.

[21] Appl. No.: 08/985,562

[22] Filed: Dec. 5, 1997

[51] Int. Cl.[7] .................................................. G06F 1/26
[52] U.S. Cl. .............................. 710/103; 307/85
[58] Field of Search .................................. 307/85, 86, 87; 365/283; 361/15, 18

[56] References Cited

U.S. PATENT DOCUMENTS

| | | | |
|---|---|---|---|
| 5,272,584 | 12/1993 | Austruy et al. | 361/58 |
| 5,376,831 | 12/1994 | Chen | 327/111 |
| 5,675,467 | 10/1997 | Nishimura et al. | 361/58 |
| 5,714,809 | 2/1998 | Clemo | 307/125 |
| 5,774,315 | 6/1998 | Mussenden | 361/18 |

*Primary Examiner*—Ayaz R. Sheikh
*Assistant Examiner*—David A. Wiley
*Attorney, Agent, or Firm*—Wagner, Murabito & Hao LLP

[57] ABSTRACT

A system and method for minimizing disruption of operating power in a high-availability computer as new power supplies are hot-inserted. In the preferred embodiment, the high-availability computer includes a plurality hot-plug power supplies, a logic circuit system, and a power distribution system for distributing operating power from the power supplies to the logic circuit system. Preferably, the output capacitance of each power supply is significantly less than the total capacitance of the logic circuit system and the power distribution system, such that, as each power supply is hot-inserted into the computer, only a minute amount of electric charges will be transferred from the power distribution system and the logic circuit system to the power supply. As a small amount of charge transfer would generate only a small voltage drop, any glitch produced by hot-insertion would be significantly reduced. In order to compensate for an increased glitch recovery time attributable to the increased capacitance, the power supply of the present invention may use a poly-phase voltage regulator. Further, the computer system of the present invention may include a timer for indicating to the service person that the power supply of the present invention has been successfully installed on an operating computer.

10 Claims, 5 Drawing Sheets

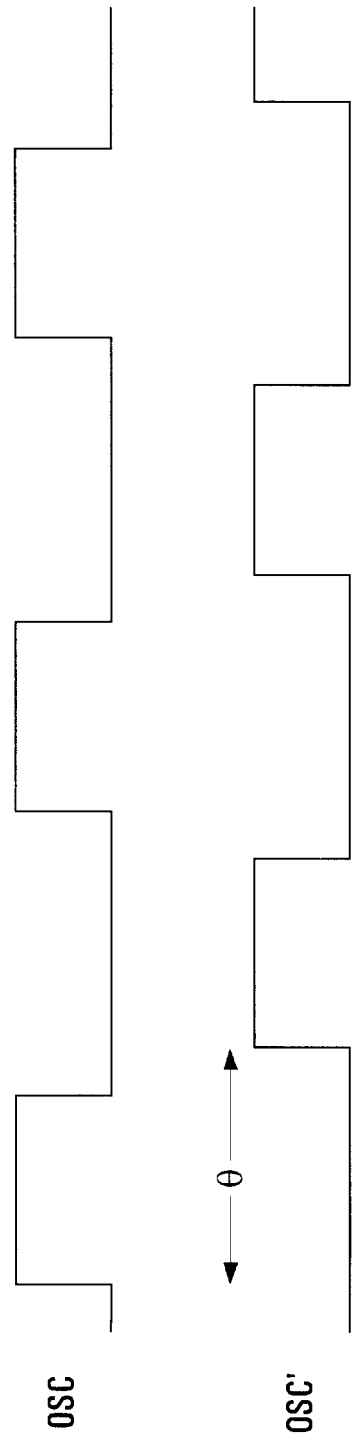
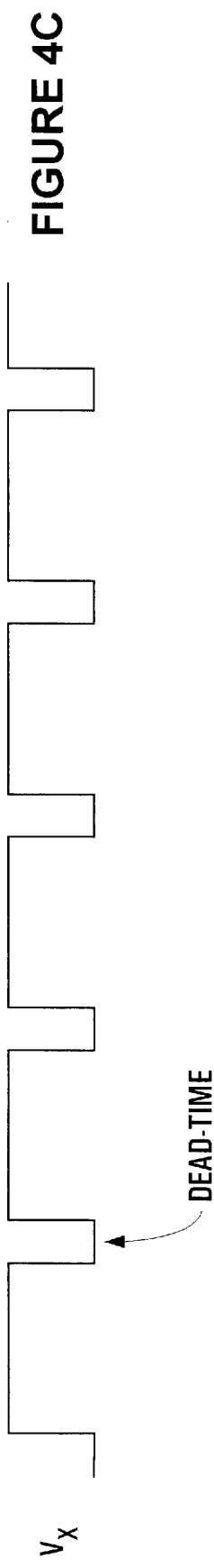
FIGURE 4A
FIGURE 4B
FIGURE 4C
OSC
OSC'
$V_X$
θ
DEAD-TIME

HOT-PLUG POWER SUPPLY FOR HIGH-AVAILABILITY COMPUTER SYSTEMS

FIELD OF THE INVENTION

The present invention relates to the field of power supplies. More specifically, the present invention relates to hot-plug power supplies for high-availability computer systems.

BACKGROUND OF THE INVENTION

High-availability computer systems, such as telecommunications networking computers and internet servers, require several backup power supplies, such that, if one power supply fails, operations of the computer systems would not be interrupted. Further, it would be undesirable to take the computer systems off-line in order to replace a malfunctioned power supply. Therefore, high-availability systems are generally designed to receive hot-plug power supplies. A hot-plug power supply is a power supply that can be hot-inserted. That is, a malfunctioned hot-plug power supply may be replaced, or a new hot-plug power supply may be connected to the system, while the system is operating. Ideally, operations of the high-availability system are not interrupted when hot-plug power supplies are replaced or added.

In reality, however, the risk of disrupting operating power during hot-insertion is high. Generally, prior art power supplies and high-availability computer systems have comparable capacitance. One such system is illustrated in FIG. 1. As an example, prior art power supply 102 has an output capacitor having a capacitance of 5C which is uncharged before power supply 102 is installed. As shown, computer system 104 also has a capacitance of 5C. Thus, when the prior art hot-plug power supply 102 is hot-inserted into the computer system 104, a glitch will be produced as currents are drawn from the computer system 104 to the uncharged output capacitors of the power supply 102. For high-speed computers such as internet servers, a tiny glitch caused by the slightest disruption in the supply power may lead to failure in the logic circuits or result in a crash. In some instances, valuable electronic components may be damaged and data may be irrecoverably lost. Therefore, the prior art power supply is unsuitable for hot-insertion.

Numerous solutions, however, have been devised to prevent the occurrence of these glitches such that prior art power supplies may be used for hot-insertion. One prior art method was to install on the high-availability systems certain mechanical features, such as special handles, special connectors or thumb screws, which prolong the power supply insertion time and allow the output capacitors of the power supplies to be charged slowly. This method, however, is not completely effective because a service person may inadvertently insert a new power supply faster than it is anticipated. In those situations, a large glitch may be produced. As a result, the computer system may experience power interruption.

Another prior art solution was to connect diodes between outputs of prior art power supplies and the computer systems. As diodes do not allow current to pass in the reverse direction, uncharged power supplies would not draw currents from the systems when hot-inserted. This solution, however, is only efficient in low current applications. In high current applications, such as high-availability computers, power dissipation across the diodes would be enormous.

Therefore, what is needed is an improved hot-plug power supply for high-availability systems which significantly reduces the size of glitches caused by hot-insertion. What is also needed is a hot-plug power supply having a low power dissipation level in high current applications. What is further needed is a hot-plug power supply having an ultra-fast dynamic response time such that the system may recover from glitches expediently. What is also needed is a hot-plug power supply that includes an indicator for signaling the computer system and a service person that the power-supply is successfully installed.

SUMMARY OF THE INVENTION

A system and method are described herein for minimizing disruption of operating power in a high-availability computer as new power supplies are hot-inserted. In the preferred embodiment, the high-availability computer includes a plurality hot-plug power supplies, a logic circuit system, and a power distribution system for distributing operating power from the power supplies to the logic circuit system. Preferably, the output capacitance of each power supply is significantly less than the total capacitance of the logic circuit system and the power distribution system, such that, as each power supply is hot-inserted into the computer, only a minute amount of electric charge will be transferred from the power distribution system and the logic circuit system to the power supply. As a small amount of charge transfer would generate only a small voltage drop, any glitch produced by hot-insertion would be significantly reduced.

In furtherance of the preferred embodiment of the present invention, in order to compensate for increased recovery time in the computer system, the power supplies may also include a high-frequency poly-phase switching voltage regulator. High-frequency switching allows small output inductors and small capacitors to be used in the power supplies. Further, poly-phase switching achieves continuous current flow through inductors of the voltage regulator with a small dead time. As a result, the power supply can recover from a glitch quickly even though the capacitance in the computer system is significantly higher than the capacitance in the power supply.

In an alternate embodiment of the present invention, the high-availability computer may include an indicator for signaling the logic circuit system that a new power supply has been successfully hot-inserted. This feature provides assurance to the service person who is otherwise unable to tell whether actual electrical connections between the power supply and the computer system have been made.

BRIEF DESCRIPTION OF THE DRAWINGS

FIG. 4 illustrates timing diagrams for signals OSC, OSC', and $V_x$ in accordance with the preferred embodiment of the present invention.

DETAILED DESCRIPTION OF THE PREFERRED EMBODIMENT

In the following detailed description of the present invention, a system for and a method for minimizing disruptions of operating power during hot-insertion of a hot-plug power supply into a high-availability computer, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as to avoid unnecessarily obscuring aspects of the present invention.

Capacitance Re-distribution

Figure 1:
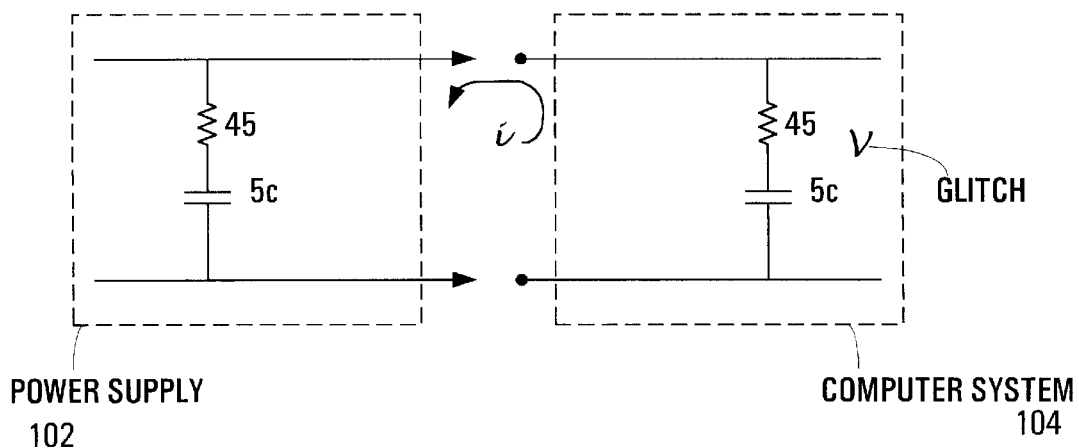
FIG. 1 illustrates a prior art power supply and a prior art computer.
Figure 2:
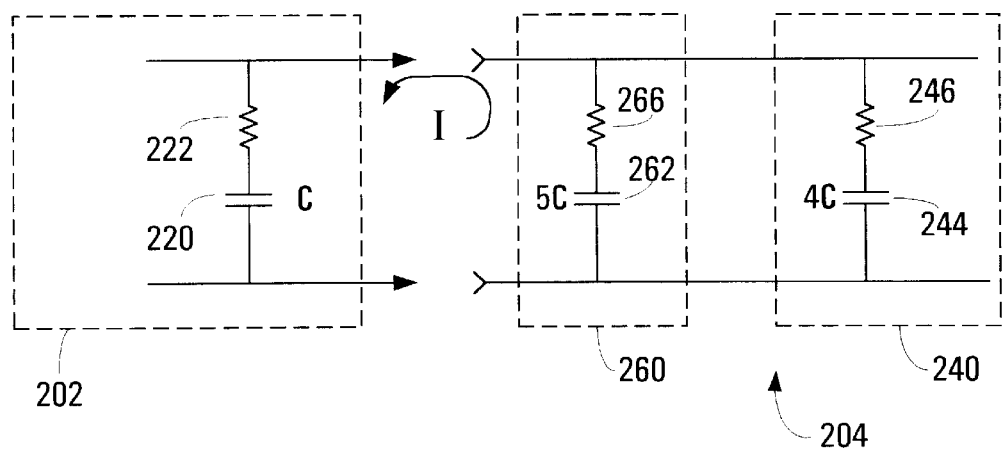
FIG. 2 is a block diagram of a power supply and a high-availability computer in accordance with the present invention.

FIG. 2 illustrates a computer system and a power supply for the computer system according to the preferred embodiment of the present invention. As shown, the power supply 202 according to the present invention includes an output capacitor 220 and an output resistor 222. The output capacitor 220, which has a capacitance C, is not charged before the power supply is inserted into computer system 204. The capacitance C is arbitrary, and the present invention is intended to cover various values of capacitance. In the preferred embodiment, the capacitance C is one tenth of an optimum capacitance necessary for the computer system and the power supply to function properly.

The computer system 204 includes a logic circuit system 240 and a power distribution system 260. The logic circuit system 240 typically includes PC boards, microprocessors, and other circuitry. The logic circuit system 240 has an equivalent capacitance represented by capacitor 244 and an equivalent resistance represented by resistor 246. As shown, the capacitor 244 has a capacitance of 4C. That is, the capacitor 244 has four times the capacitance of the output capacitor 220 of the power supply 202.

The power distribution system 260 includes circuitry for connecting the power supply 202 to various components of the logic circuit system 240. As shown, the power distribution system 210 has an equivalent capacitance of 5C represented by the capacitor 262. That is, the capacitor 262 has five times the capacitance of the output capacitor 220 of the power supply 202. Thus, the total capacitance of the computer system 204 is nine times the capacitance of the output capacitor 220 of the power supply 202. The power distribution system 260 also includes a equivalent resistance represented by resistor 266.

It is important to note that the combined capacitance of the computer system 204 and the power supply 202 is not arbitrary. Rather, the combined capacitance corresponds to an optimum capacitance for the computer system 204 and the power supply 202. The optimum capacitance depends on the particular design of the computer system and the power supplies, and can be calculated using well known methods. According to the preferred embodiment, the capacitance of the power supply 202 is made to be 10% of the optimum capacitance, and the capacitance of the computer system 204 is made to be 90% of the optimum capacitance. It should be apparent to those ordinarily skilled in the art, upon reading the disclosure, that other ratio of capacitance may be implemented. However, it is determined that a 1:9 ratio between the power supply capacitance and the computer system capacitance achieves the goal of the invention, and at the same time, is cost effective.

A discussion of the operation of the improved hot-plug power supply of the present invention follows. Before the power supply 202 is connected to the computer system 204, the output capacitor 220 is uncharged. However, because the computer system 204 is on-line, the capacitors 244 and 262 are charged. Thus, when the power supply 202 is connected to the computer system 204, a current I will flow from the computer system 204 to the power supply. The magnitude of the current I depends on the capacitance of the output capacitor. As the current I is drawn from the computer system 204, the computer system 204 will experience a slight voltage drop. The magnitude of the voltage drop, however, is dependent on the capacitance of capacitors 244 and 262. Because the capacitance of the power supply 202 is significantly less than the capacitance of the capacitors 244 and 262, the voltage drop will be significantly reduced. Thus, an objective of the present invention to minimize glitches produced during hot-insertion of a power supply is achieved when capacitance of power supply 202 and the computer system 204 is rearranged and redistributed according to the present invention.

Poly-Phase Switching for Ultra-fast Dynamic Response

In order to achieve a lower output capacitance in the power supply 202, it is necessary to use a poly-phase switching voltage regulator. Further, the computer system of the present invention may have a long glitch recovery time attributable to the increased capacitance. In furtherance of the preferred embodiment of the present invention, in order to compensate for increased glitch recovery time, the power supplies may also include high-frequency poly-phase switching voltage regulators. High-frequency switching allows small output inductors and small capacitors to be used in the power supplies. Further, poly-phase switching achieves continuous current flow through inductors of the voltage regulator with a small dead time. As a result, the power supply can recover from a glitch quickly even though the capacitance in the computer system is significantly higher than the capacitance in the power supply.

Figure 3:
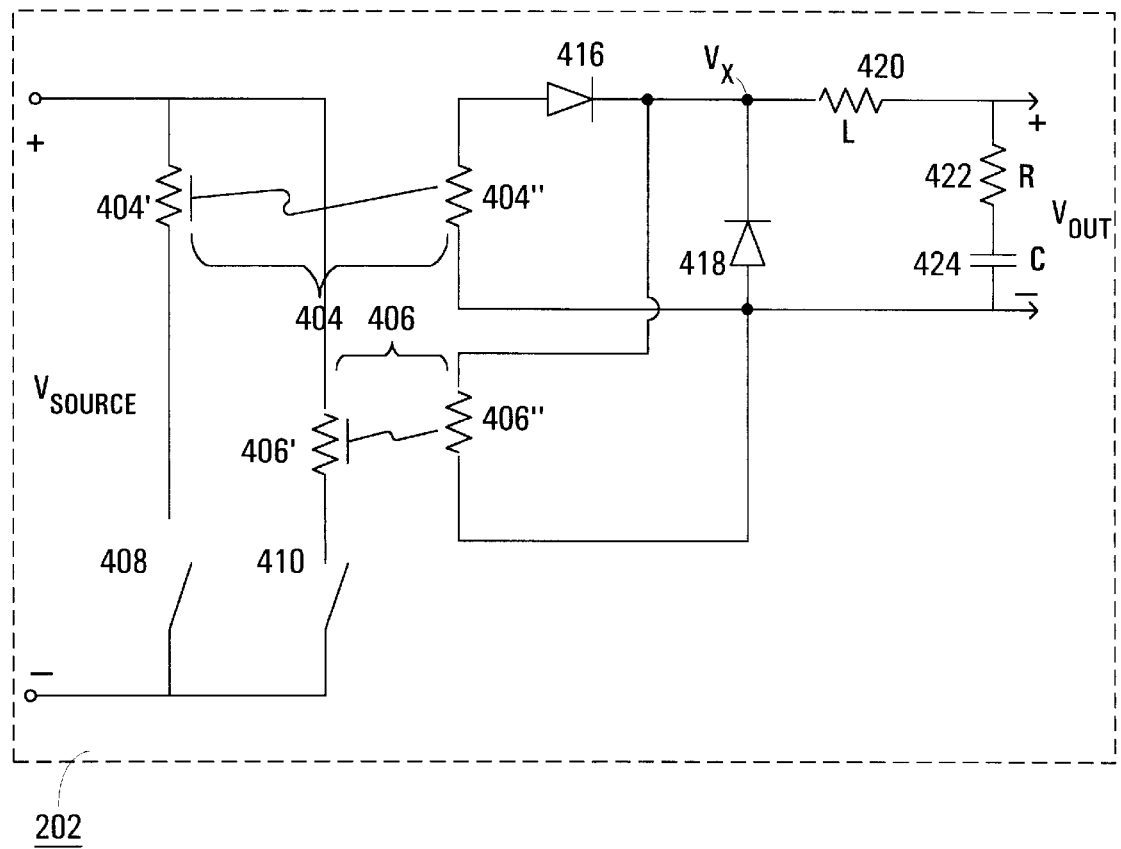
FIG. 3 illustrates a schematic of the power supply according to the preferred embodiment of the present invention.

FIG. 3 illustrates the poly-phase switching voltage regulator according to the present invention. As shown in FIG. 3, poly-phase switching voltage regulator includes a voltage source, $V_{SOURCE}$, to a first end of a primary winding 404' of a first transformer 404. Circuitry for generating the voltage source $V_{SOURCE}$ in a power supply is well known in the art, and is therefore not discussed in detail here in order to avoid obscuring aspects of the present invention. A second end of the primary winding 404' is coupled to a first end of a first electronic switch 408. In one embodiment, the switch 408 may include a MOSFET coupled to a receive a control signal OSC from an oscillator (not shown). A timing diagram 301 of control signal OSC is illustrated in FIG. 4. When OSC is "low," the first switch 408 is open, and when OSC is "high," the first switch 408 is closed.

Additionally, as shown in FIG. 3, the first end of the primary winding 404' is also coupled to a first end of a primary winding 406' of a second transformer 406. A second end of the primary winding 406' is coupled to a second electronic switch 410. In one embodiment, like the first electronic switch 408, the second electronic switch 410 may also include a MOSFET coupled to receive a control signal OSC' from the oscillator (not shown). A timing diagram 303 of control signal OSC' is illustrated in FIG. 4. When OSC' is "low," the second switch 410 is open, and when OSC' is "high," the second switch 410 is closed. OSC', however, lags behind OSC by a phase angle Θ. Second ends of the switches 408 and 410 are also coupled together to the voltage source $V_{SOURCE}$.

A secondary winding 404" of the first transformer 404, and a secondary winding 406" of the second transformer 406, are electro-magnetically coupled to the primary winding 404' and the primary winding 406', respectively. A first end of the secondary winding 404" is coupled to an anode of a first diode 416, and a second end of the secondary winding 404" is coupled to an anode of a second diode 418. A first end of the secondary winding 406" is coupled to a cathode of a first diode 416 and to a cathode of the diode 418. A second end of the secondary winding 406" is coupled to an anode of a second diode 418, and the second end of the secondary winding 404". The cathodes of the first diode 416 and the second diode 418 are coupled to a first end of an inductor 420. A second end of the inductor 420 is coupled to a first end of a resistor 422. A second end of the resistor 422 is coupled to a first end of an output capacitor 424, and a second end of the output capacitor 424 is coupled to the anode of the second diode 418. The output resistor 422 and the output capacitor 424 forms an output voltage $V_{OUT}$ when the power supply is operative.

According to the preferred embodiment of the present invention, the switches 408 and 410 and the transformers 404 and 406 generate a voltage, $V_x$, at the first end of the inductor 420 is shown in FIG. 4. A timing diagram 305 of the voltage $V_x$. As shown, "dead-time" of $V_x$ is small. In one embodiment of the present invention, the "dead-time" is 10% of the period of $V_x$. In other words, in that embodiment of the present invention, a duty cycle $V_x$ is 90%. By decreasing the "dead-time" of $V_x$, the dynamic response time of the power supply 202 is significantly decreased. That is, when a glitch occurs when a new power supply is hot-inserted into the system, the other operating power supplies would be able to supply adequate current to the computer system such that the glitch is expediently recovered. Thus, by using a poly-phase switching voltage regulator, the mechanism for reducing glitch in a computer system is significantly enhanced.

According to one alternate embodiment of the present invention, the poly-phase voltage regulator 300 may be replaced by a poly-phase switching voltage regulator having more than two switches. However, a poly-phase switching voltage regulator with more than two switches are not cost-effective, since they are much more expensive but the resulting dynamic response is not significantly better than a poly-phase switching voltage regulator with only two switches.

According to another alternate embodiment of the present invention, the poly-phase voltage regulator may be replaced by a high-frequency switching voltage regulator. This solution, however, is also not as cost effective as the preferred embodiment of the present invention.

Timer

In furtherance of the preferred embodiment of the present invention, the power supply includes an indicator for signaling the logic circuit system that a new power supply has been successfully hot-inserted. This feature provides assurance to the service person who is otherwise unable to tell whether actual electrical connections between the power supply and the computer system have been made.

Figure 5:
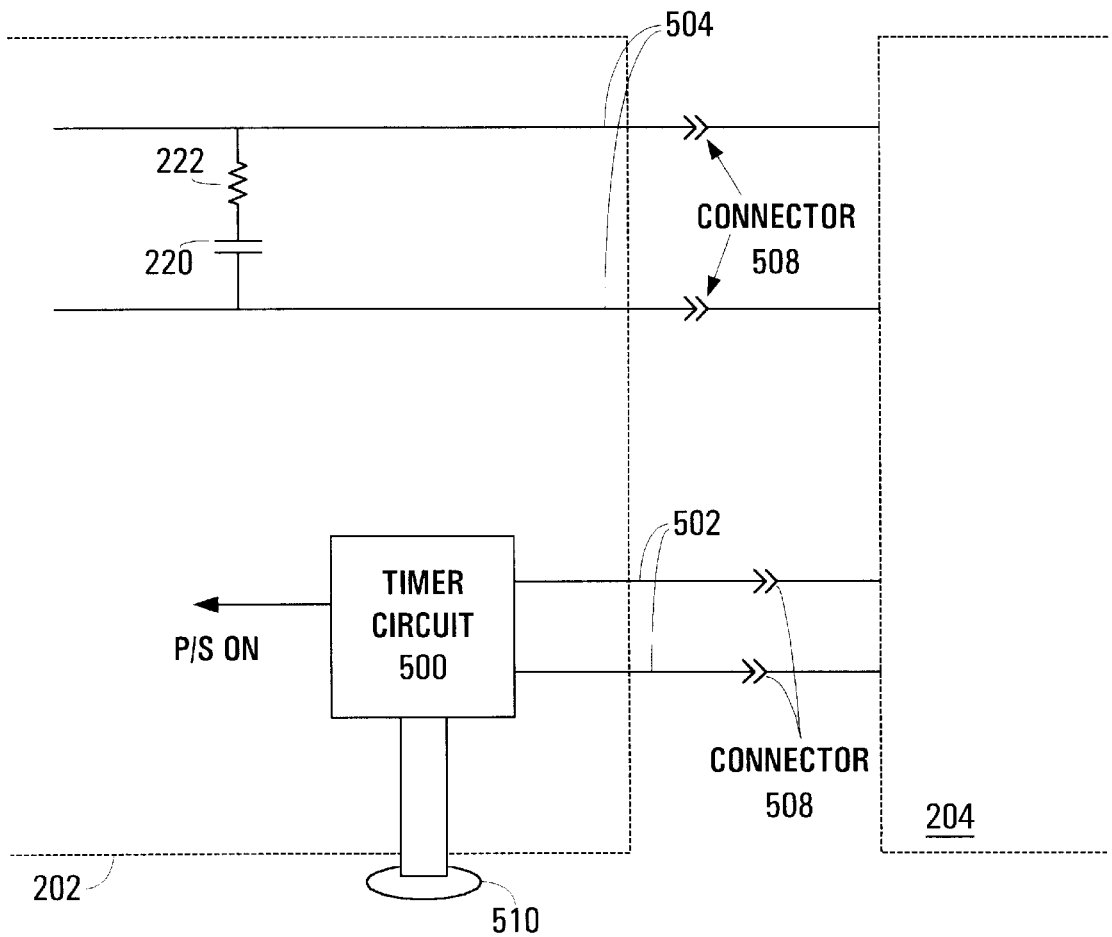
FIG. 5 illustrates a block diagram of a timer circuit according to the preferred embodiment of the present invention.

FIG. 5 illustrates a timer of the present invention. As shown, the power supply 202 of the present invention includes a timer circuit 500 coupled to the computer system 204 via test current lines 502. The power supply 204 is also coupled to the computer system 204 via main power lines 504. Further, in accordance to the preferred embodiment of the present invention, a male-female connector 508 are used to connect the power supply 202 to the computer system 204, and the test current lines 502 and the main power lines 504 are coupled to different pins on the male-female connector 508.

Figure 6:
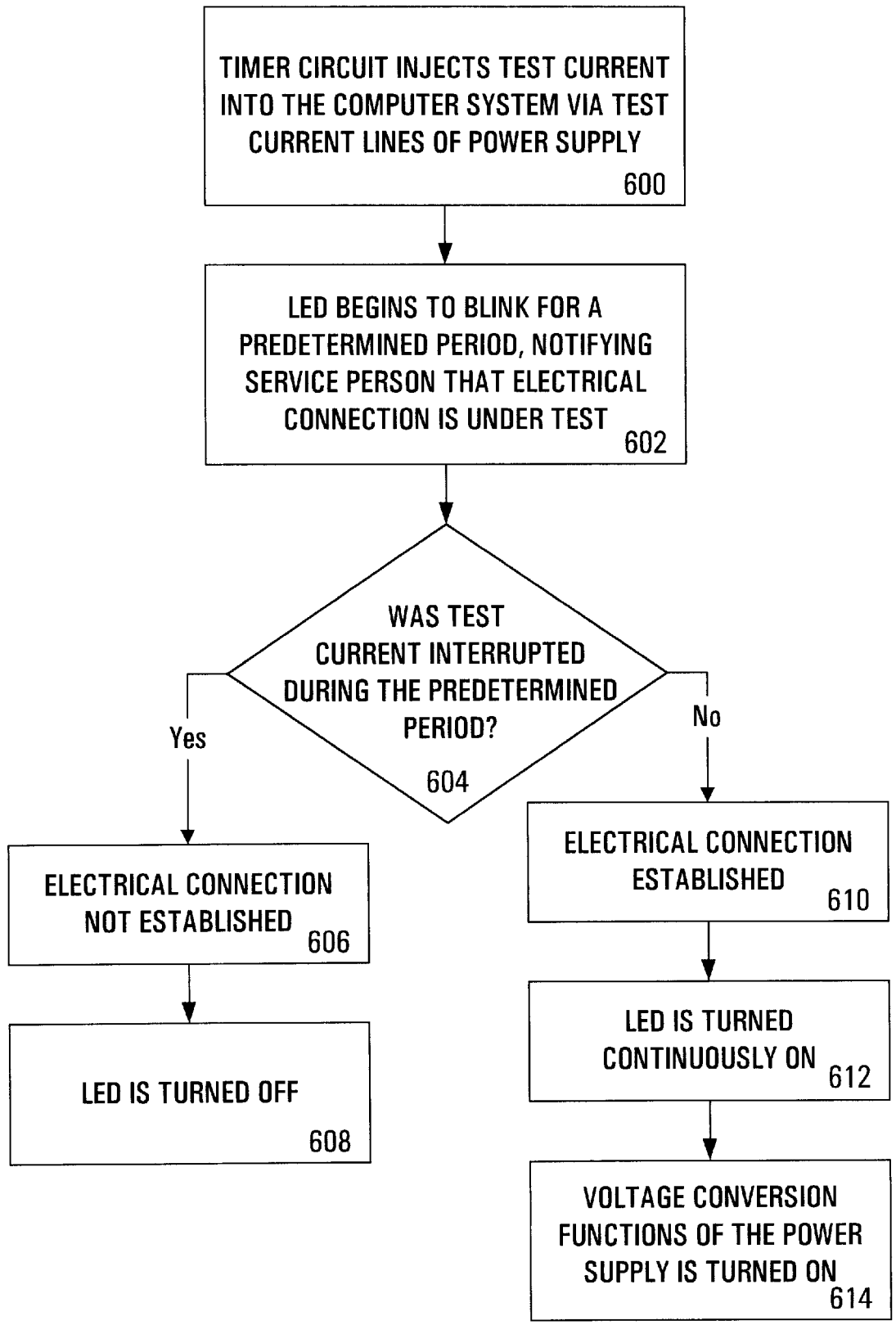
FIG. 6 is a flow diagram illustrating the operations of the timer circuit of the present invention.

FIG. 6 is a flow chart illustrating the operations of the timer of the present invention. The timer circuit 500 first detects whether the power supply output lines 502 and 504 have successfully established electrical connection with the computer system 204. In the preferred embodiment, the detection step is carried out by injecting a test current via the output lines 502 and 504 into the computer system 204 (Box 600). The test current is continuously injected for a predetermined period of time. For instance, the timer circuit 500 may begin to count three seconds from the beginning of the test current.

The timer circuit 500 is also coupled to a green LED 510. During the predetermined period, the green LED 510 is configured to blink while the test current is being injected (Box 602). In this way, the service person installing the hot-plug power supply 202 would be notified that electrical connections are currently under test. Then, the timer circuit 500 determines if the test current has been interrupted (Box 604). If the test current is interrupted within the predetermined time, then electrical connection has not been successfully established (Box 606), and the timer circuit 500 switches off the green LED 510 (Box 608). However, if the test current is not interrupted for the predetermined period, then electrical connection has been successfully established (Box 610), and the timer circuit 500 turns on the green LED 510 (Box 612). Thus, the service person would be able to determined whether electrical connections have been established or not. If it is determined that electrical connections have been successfully established, the timer circuit 500 signals the power supply 202 to begin supplying power to the computer system 204 (Box 614).

An improved hot-plug power supply for high-availability computer systems has thus been disclosed. By redistributing the capacitance between the power supply and the computer system, any glitches produced during hot-insertion will be minimized. Furthermore, by using poly-phase switching, a small output capacitance of the power supply can achieved. In addition, a timer circuit provides a fool-proof way of allowing a service person to determine whether electrical connection between the power supply and the computer system has been successfully established. Overall efficiency of the power supply is also improved as it is no longer necessary to place a diode between the power supply and the computer system to prevent the glitch.

What is claimed is:

1. A computer comprising:
   a power supply system for supplying operating power to the computer, the power supply system having a plurality of hot-plug power supplies;
   a logic circuit for performing logic operations of the computer, the logic circuit having a first capacitance; and
   a power distribution system for distributing power from the power supply system to the logic circuit system, the power distribution system having a second capacitance,
   each hot-plug power supply having a third capacitance lower than a combination of the first capacitance and the second capacitance, wherein glitches produced during hot-insertion of the hot-plug power supplies are minimized and wherein each hot-plug power supply further comprises a poly-phase switching voltage regulator for rapidly responding to glitches produced during hot-insertion of the hot-plug power supply.

2. The computer of claim 1 wherein a total of the first capacitance, the second capacitance, and the third capacitance corresponds to an optimum capacitance for the high-availability computer as determined according to a predetermined algorithm.

3. The computer of claim 1 wherein a ratio of the third capacitance to the combination of first and second capacitance is 1:9.

4. The computer of claim 1 further comprising a plurality of indicators coupled the power supplies, each indicator for indicating a successful establishment of electrical connections between a respective one of the power supplies and the power distribution system.

5. A hot-plug power supply for hot-insertion into a computer, the computer having a system capacitance, the hot-plug power supply comprising:

a poly-phase switching voltage regulator; and an output capacitor coupled to the poly-phase switching voltage regulator, the output capacitor having an output capacitance, the output capacitance being lower than the system capacitance, wherein glitches generated during hot-insertion of the hot-plug power supply into the high-availability computer are minimized, further wherein the poly-phase switching voltage regulator minimizes a glitch recovery and response time of the computer.

6. The hot-plug power supply according to claim 5 wherein a ratio between the output capacitance and the system capacitance is 1:9.

7. The hot-plug power supply according to claim 5 further comprising a timer circuit for indicating a successful establishment of electrical connections between the hot-plug power supply and the computer.

8. The hot-plug power supply according to claim 7 wherein the timer circuit further comprises:

means for injecting a test current into the high-availability computer;

means for timing a predetermined period of time, wherein the test current is continuously injected for the predetermined period; and means for detecting interruptions in the test current during the predetermined period of time, wherein the hot-plug power supply starts supplying power to the high-availability computer when the test current is uninterrupted during the predetermined period.

9. The hot-plug power supply according to claim 8 wherein the predetermined period is three seconds.

10. The hot-plug power supply according to claim 8 further comprising an LED, the LED being configured to blink when test current is continuously injected into the high-availability computer, to turn off when the test current is interrupted during the pre-determined of time, and to turn on when the test current is uninterrupted during the pre-determined of time, wherein a service person installing the hot-plug power supply is informed of a status of electrical connections between the hot-plug power supply and the high-availability computer.

* * * * *